(12) United States Patent
Yang

(10) Patent No.: US 8,248,807 B2
(45) Date of Patent: Aug. 21, 2012

(54) LOCKING MECHANISM AND ELECTRONIC DEVICE HAVING THE SAME

(75) Inventor: Song-Ling Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 365 days.

(21) Appl. No.: 12/616,155

(22) Filed: Nov. 11, 2009

(65) Prior Publication Data
US 2010/0172108 A1 Jul. 8, 2010

(30) Foreign Application Priority Data
Jan. 7, 2009 (CN) .......................... 2009 1 0300097

(51) Int. Cl.
*H05K 7/00* (2006.01)
*H05K 5/00* (2006.01)

(52) U.S. Cl. .............. 361/728; 361/679.02; 361/679.57; 361/732; 361/747

(58) Field of Classification Search .................. 292/164; 455/575.1, 575.3; 361/312, 728, 679.57, 361/679.58, 801–803, 813, 732, 747
See application file for complete search history.

(56) References Cited

U.S. PATENT DOCUMENTS

| | | | | |
|---|---|---|---|---|
| 5,841,631 A * | 11/1998 | Shin et al. | ................ | 361/679.58 |
| 6,115,239 A * | 9/2000 | Kim | ......................... | 361/679.57 |
| 6,891,722 B2 * | 5/2005 | Chen et al. | ............... | 361/679.55 |
| 7,082,035 B2 * | 7/2006 | Kim | .............................. | 361/726 |
| 2002/0089190 A1 * | 7/2002 | Wang et al. | ................. | 292/251.5 |
| 2006/0006674 A1 * | 1/2006 | Kang et al. | .................. | 292/251.5 |
| 2008/0072336 A1 * | 3/2008 | Tung et al. | ...................... | 726/34 |
| 2008/0218953 A1 * | 9/2008 | Yun et al. | ....................... | 361/681 |
| 2009/0296328 A1 * | 12/2009 | Lin et al. | ................... | 361/679.02 |
| 2010/0066640 A1 * | 3/2010 | Wakefield | ...................... | 345/1.1 |

* cited by examiner

*Primary Examiner* — Timothy Thompson
*Assistant Examiner* — Sherman Ng
(74) *Attorney, Agent, or Firm* — Altis Law Group, Inc.

(57) ABSTRACT

An electronic device includes a main body, a cover rotatably connected to the main body, at least one locking mechanism for fastening the cover to the main body, and a switch. The locking mechanism defines a locking hole in the main body and includes a locking member fixed to the cover. The locking member includes a magnetic member, an electromagnet, a compressed spring, and a locking pin. The electromagnet is electrically connected to the switch, and is operable to be powered off via switching the switch. The spring is disposed between the magnetic member and the electromagnet, and moves one of the magnetic member and the electromagnet when the electromagnet is powered off. The locking pin is inserted into the locking hole when the cover covers the main body and the electromagnet is powered off.

13 Claims, 6 Drawing Sheets

LOCKING MECHANISM AND ELECTRONIC DEVICE HAVING THE SAME

BACKGROUND

1. Technical Field

The present disclosure relates to locking mechanisms, and particularly to an electromagnetic locking mechanism and an electronic device having the same.

2. Description of Related Art

Portable electronic devices such as laptops, portable DVD players, are widely used. A typical portable electronic device includes a main body and a cover rotatably connected to the main body for covering the main body. When the portable electronic device is carried, the cover may be opened undesirably when dropped or bumped against other objects.

Therefore, it is desirable to provide a locking mechanism and an electronic device having the same which can overcome the above-mentioned problems.

BRIEF DESCRIPTION OF THE FIGURE

The components of the drawings are not necessarily drawn to scale, the emphasis instead being placed upon clearly illustrating the principles of the embodiments of an electronic device. Moreover, in the drawings, like reference numerals designate corresponding parts throughout several views.

DETAILED DESCRIPTION

Embodiments of the present disclosure will now be described in detail with reference to the drawings.

Figure 1:
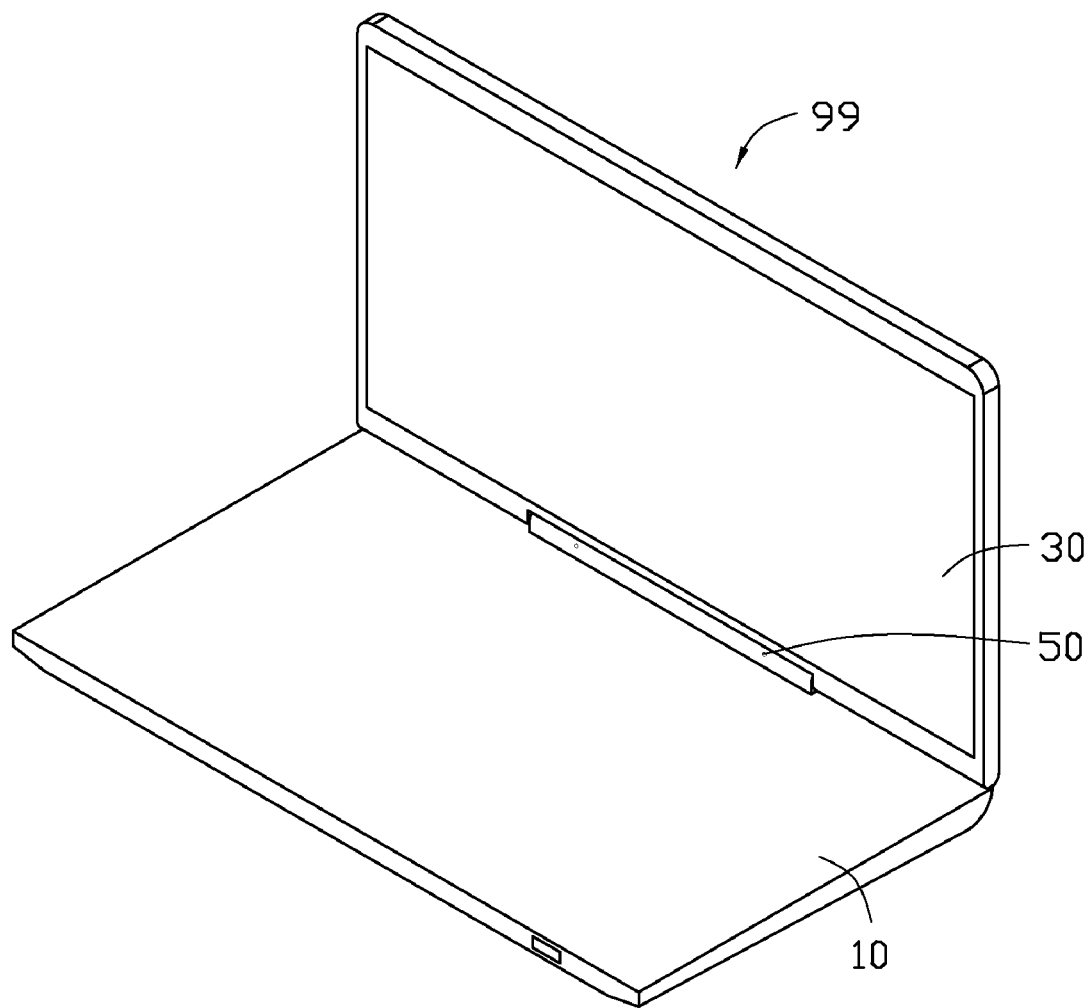
FIG. 1 is an assembled, isometric, schematic view of an electronic device, according to an exemplary embodiment; the electronic device includes a cover having a screen panel.

Referring to FIG. 1, an electronic device 99 includes a main body 10, a cover 30 rotatably connected to the main body 10, and two locking mechanisms 50 for fastening the cover 30 to the main body 10. The electronic device 99 may be a laptop, a portable media player, a mobile phone, etc. In this embodiment, the electronic device 99 is shown as a laptop for description.

Figure 2:
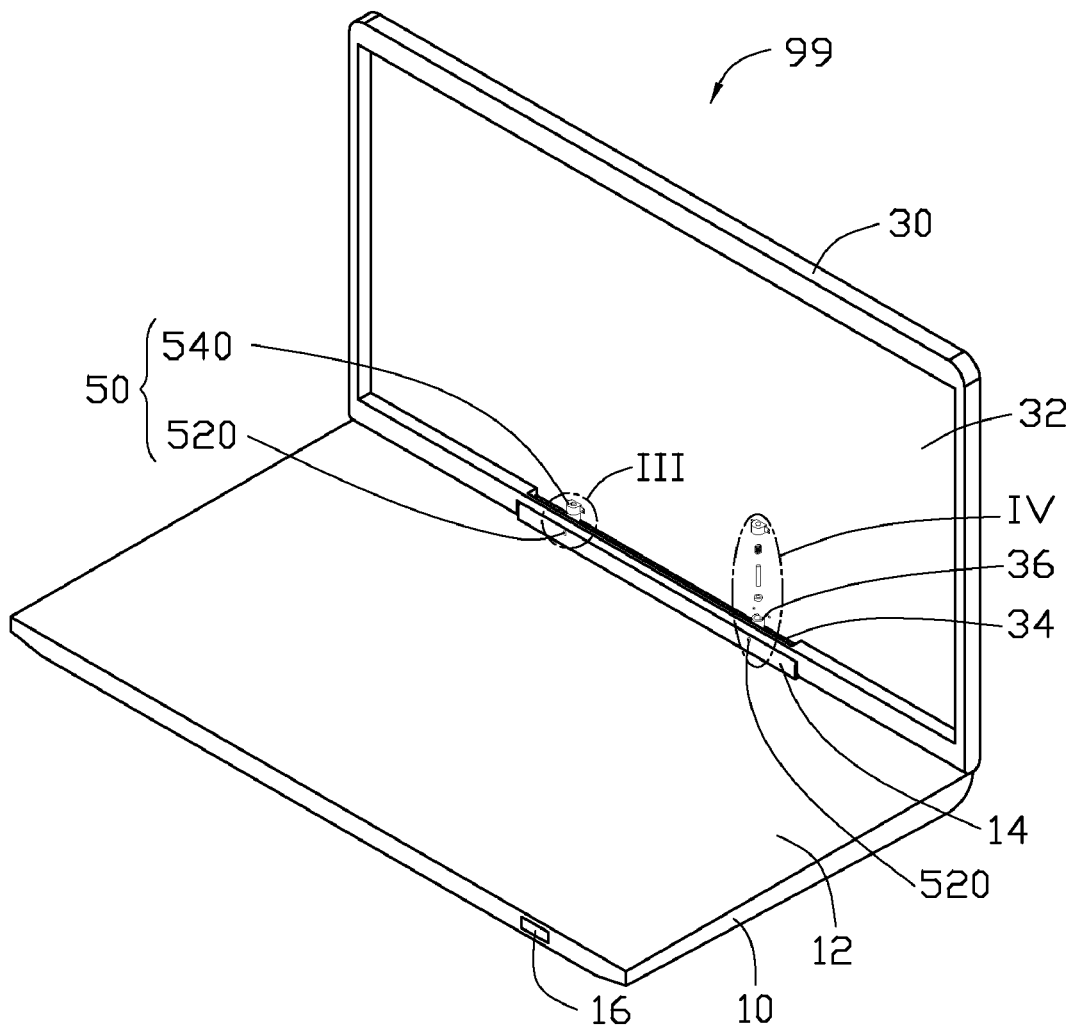
FIG. 2 is a partial exploded view of the electronic device of FIG. 1; the screen panel is removed from the cover.

Referring to FIG. 2, the main body 10 includes a base 12, a seat 14 protruding upwards from an edge of the base 12, and a switch 16 mounted on a side surface of the base 12. The switch 16 is electrically connected to the locking mechanisms 50 to change a lock state of the locking mechanisms 50.

Figure 3:
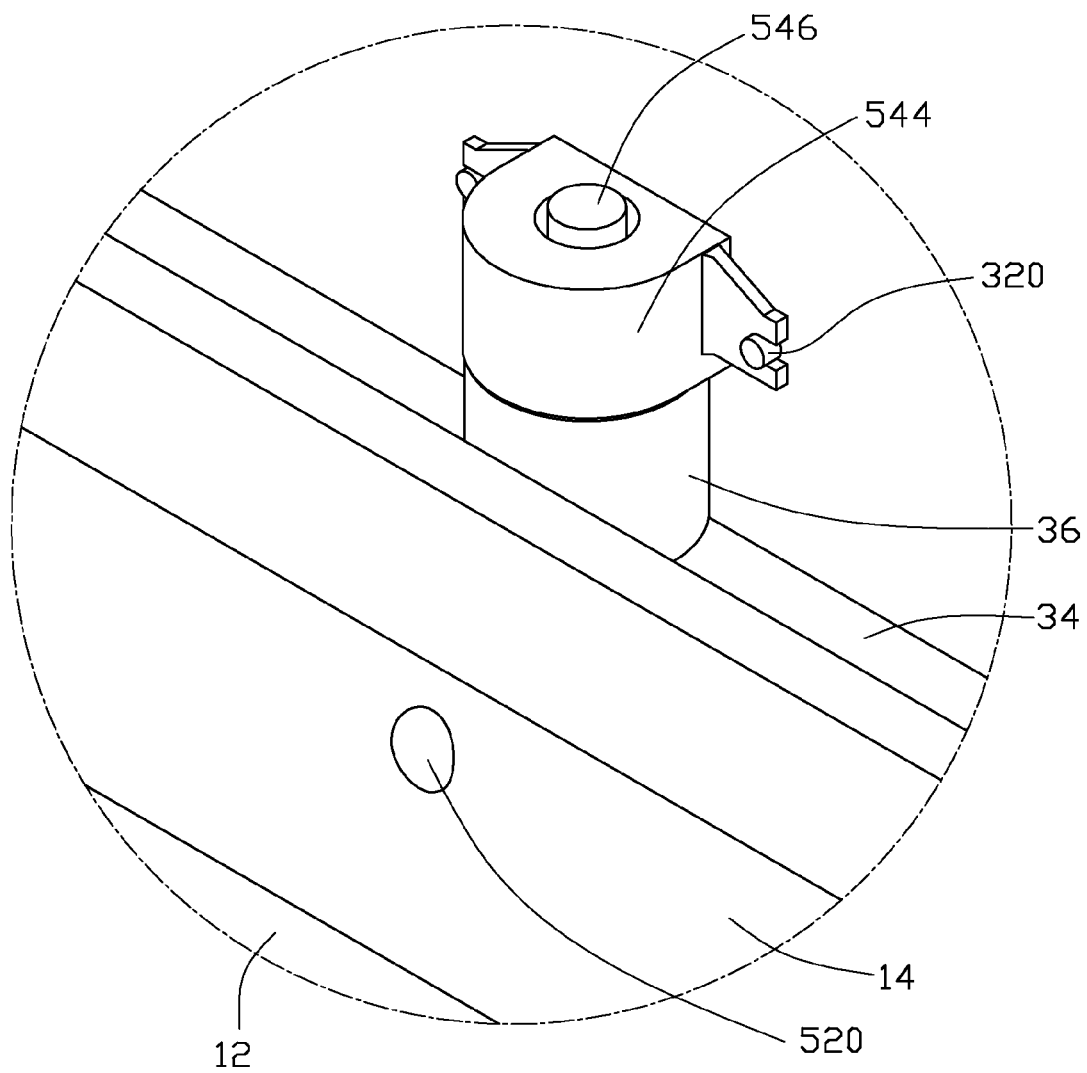
FIG. 3 is an enlarged view of a first circled portion III of FIG. 2.
Figure 4:
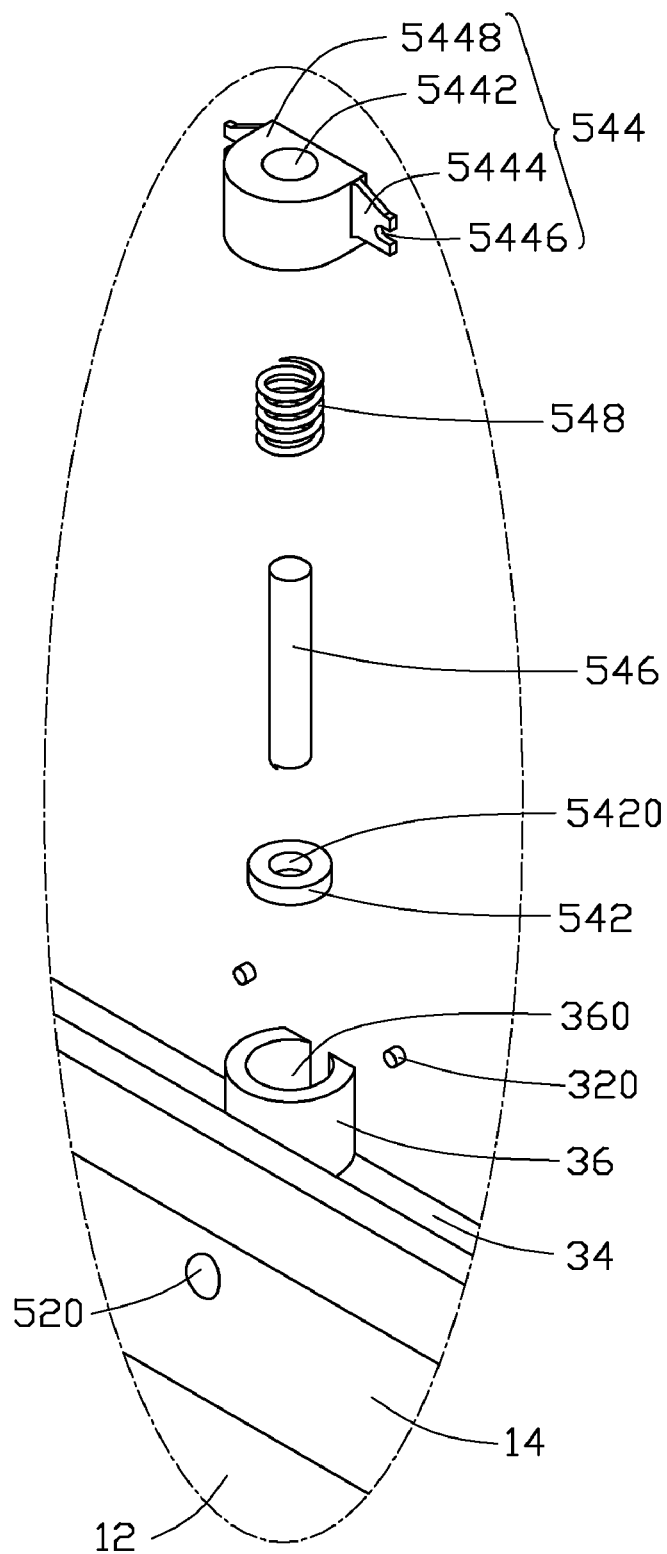
FIG. 4 is an enlarged view of a second circled portion IV of FIG. 2.

The cover 30 is pivotally connected to the seat 14 such that the cover 30 is rotatable about the seat 14 to cover the base 12. The cover 30 includes a screen panel (shown in FIG. 1, not labeled), a cover plate 32, a sidewall 34 perpendicularly protruding from an edge of the cover plate 32, and two holders 36 mounted on the sidewall 34. The holders 36 are cylindrical and parallel to the cover plate 32. Further referring to FIGS. 3-5, the sidewall 34 defines two positioning through holes 342 (shown in FIG. 5) facing the seat 14. The two holders 36 each define a receiving through hole 360 communicating with a corresponding positioning through hole 342. The receiving through hole 360 has a diameter larger than the positioning through hole 342. The cover 30 further includes two pairs of fixing pins 320. The fixing pins 320 are mounted on the cover plate 32 on opposite sides of the holders 36 correspondingly.

The two locking mechanisms 50 each define a locking hole 520 in the seat 14, and includes a locking member 540 disposed on each of the holders 36 correspondingly. The locking holes 520 are aligned with the holders 36 correspondingly, and have a diameter equal to that of the positioning through hole 342. The two locking members 540 each include a magnetic member 542, an electromagnet 544, a locking pin 546, and a spring 548. The magnetic member 542 is ring-shaped and defines a fixing through hole 5420. The magnetic member 542 can be a magnet or made of a ferromagnetic material such as iron. In assembly, the locking pin 546 is inserted through the fixing through hole 5420 and fixed to the magnetic member 542. The magnetic member 542 and the locking pin 546 are inserted into the receiving through hole 360, and one end of the locking pin 546 is inserted into the positioning through hole 342. The spring 548 is sleeved on the locking pin 546 from the other side of the locking pin 546 away from the positioning through hole 342, and resists the magnetic member 542. The length of the spring 548 in a normal state is longer than the depth of the receiving through hole 360.

The electromagnet 544 includes a cylindrical body 5448 defining a passing through hole 5442, and two fixing portions 5444 extending from two opposite sides of the body 5448. The fixing portions 5444 each define a notch 5446. The body 5448 is sleeved on the locking pin 546 via the passing through hole 5442, and covers the holder 36 to enclose the magnetic member 542 and the spring 548. The fixing portions 5444 are sleeved on the fixing pins 320 correspondingly to fix the electromagnet 544 to the cover plate 32. The electromagnet 544 is electrically connected to the switch 16, such that the electromagnet 544 can be powered on and powered off via the switch 16. The electromagnet 544 can attract the magnetic member 542 when the electromagnet 544 is powered on.

Figure 5:
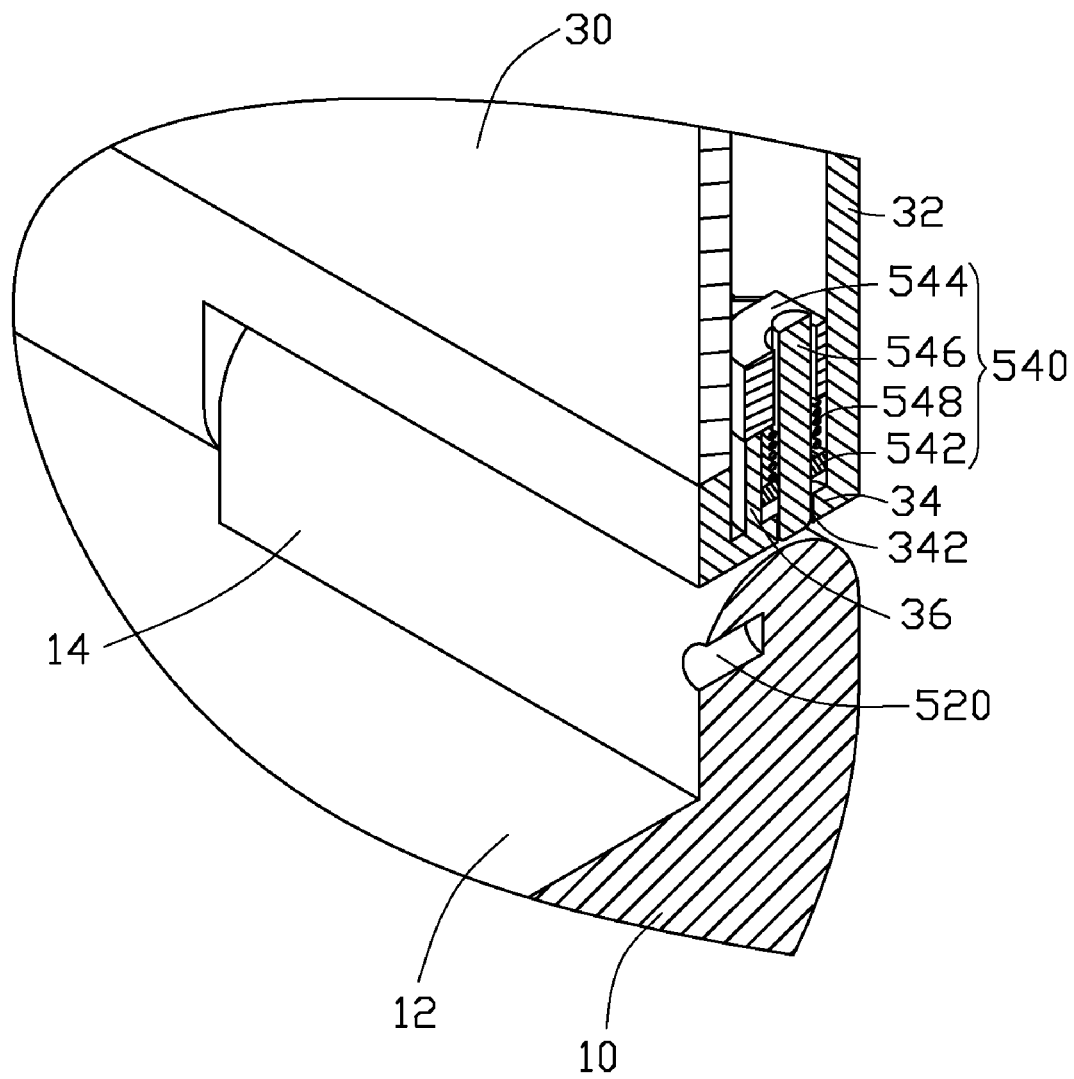
FIG. 5 is a partial cross-sectional view of the electronic device of FIG. 1 while the electronic device is in a first state.

Referring to FIG. 5, when the electromagnet 544 is powered on to attract the magnetic member 542, the magnetic member 542 and the locking pin 546 move in the holder 36 toward the electromagnet 544. One end of the locking pin 546 extends out of the electromagnet 544, and the other end of the locking pin 546 is received in the positioning through hole 342. The spring 548 becomes compressed by the magnetic member 542 and the electromagnet 544. As such, the cover 30 can rotate about the seat 14.

Figure 6:
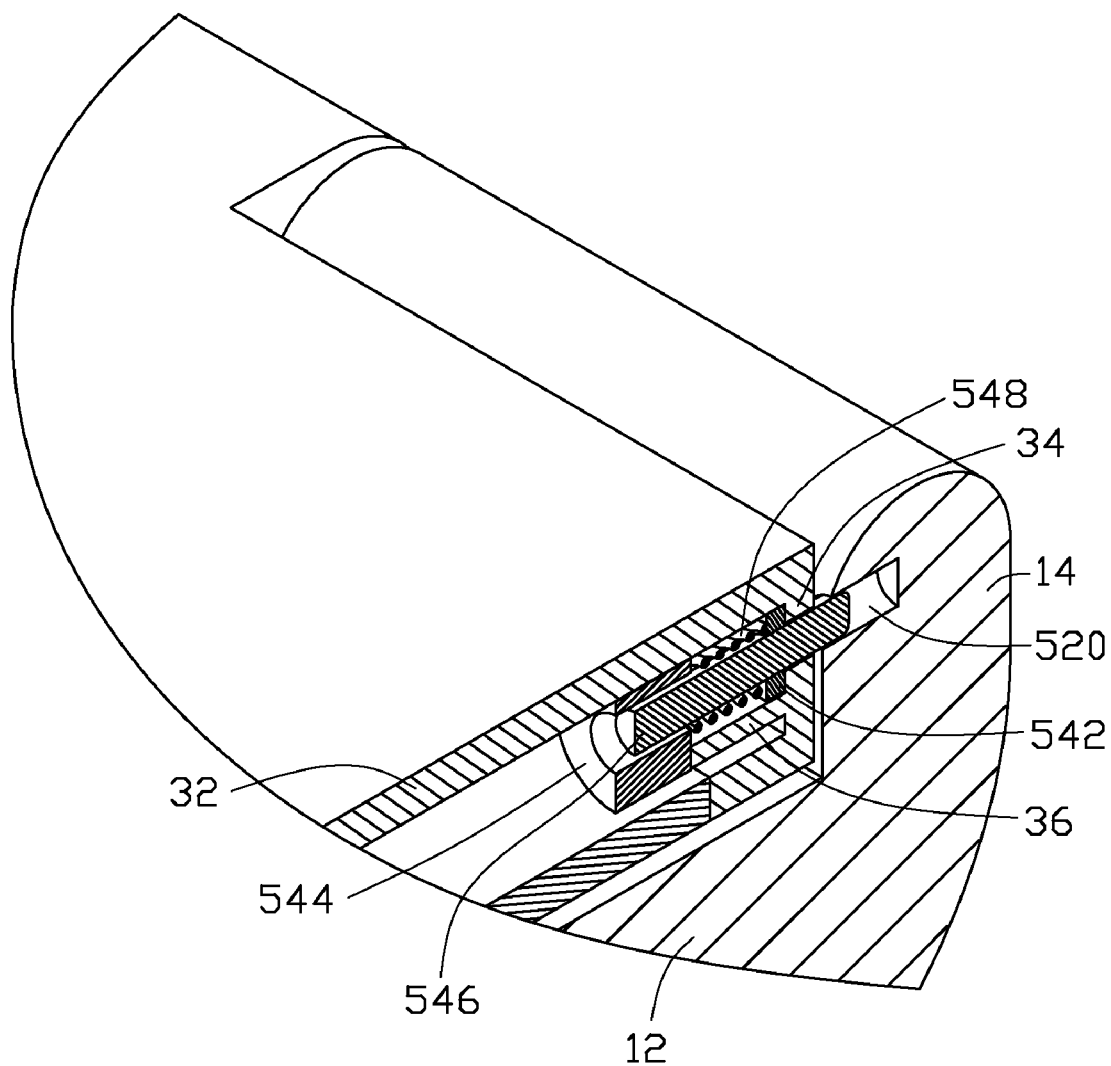
FIG. 6 is a partial cross-sectional view of the electronic device of FIG. 1 while the electronic device is in a second state.

Referring to FIG. 6, when the cover 30 covers the base 12, the positioning through hole 342 is aligned with the locking hole 520. The switch 16 may be actuated to power off the electromagnet 544 and release the magnetic member 542. Accordingly, the compressed spring 548 pushes the magnetic member 542 to a normal position, as a result, the locking pin 546 is inserted into the locking hole 520. As such, the cover 30 is fastened to the main body 10 and cannot freely rotate about the seat 14.

It should be understood that, in an alternative embodiment, the locking member 540 also can be received in the seat 14, and the locking hole 520 is defined in the sidewall 34. In the alternative embodiment, the seat 14 defines a receiving space (not shown) to receive the locking member 540. The seat 14 further defines a receiving through hole (not shown) to allow the locking pin 546 to be inserted through the receiving through hole and into the locking hole 520.

It should be mentioned that the locking pin 546 can be fixed to the electromagnet 544 in another alternative embodiment, while the electromagnet 544 is movably received in the holder 36, and the magnetic member 542 is disposed on the holder 36 and fixed to the cover plate 32.

It should also be mentioned that the switch 16 can be switched off when the cover 30 rotates around the seat 14 to move away from the main body 10, such that the electromagnet 544 is powered off and the spring 548 is released. As a result, the locking pin 546 is urged by an elastic force of the spring 548 to press the seat 14, such that the cover 30 is firmly positioned at a desired angle relative to the main body 10.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. An electronic device, comprising:
   a main body comprising a base and a seat protruding upwards from an edge of the base;
   a cover pivotally connected to the seat for covering the main body;
   at least one locking mechanism for fastening the cover to the main body, the at least one locking mechanism defining a locking hole in the seat and comprising a locking member fixed to the cover; and
   a switch electrically connected to the at least one locking mechanism for switching the at least one locking mechanism;
   wherein the locking member comprises:
   a magnetic member;
   an electromagnet electrically connected to the switch and operable to be powered on and powered off via switching the switch, the electromagnet being operable to attract the magnetic member when the electromagnet is powered on;
   a spring disposed between the magnetic member and the electromagnet, the spring being operable to push one of the magnetic member and the electromagnet toward the locking hole when the electromagnet is powered off; and
   a locking pin fixed to one of the magnetic member and the electromagnet, the locking pin being operable to move with one of the magnetic member and the electromagnet, in a first manner so as to detach from the locking hole when the electromagnet is powered on, and in a second manner so as to be inserted into the locking hole to fasten the cover to the main body when the cover covers the main body and the electromagnet is powered off,
   wherein the switch is operable to be switched off to power off the electromagnet when the cover rotates around the seat to move away from the main body, such that the spring is released from an attractive force generated by the electromagnet and the magnet, and the locking pin is urged by an elastic force of the spring to press the seat of the main body, so as to position the cover at a desired angle relative to the main body.

2. The electronic device of claim 1, wherein the electromagnet is fixed to the cover, the magnetic member is operable to move relative to the electromagnet, the locking pin is fixed to the magnetic member.

3. The electronic device of claim 2, wherein the magnetic member defines a fixing through hole therein, the locking pin is inserted through the fixing through hole, the spring is sleeved on the locking pin.

4. The electronic device of claim 3, wherein the cover comprises a cover plate, a sidewall protruding from the cover plate, and a holder mounted on the sidewall, the magnetic member is movably received in the holder, the electromagnet is disposed on the holder to enclose the magnetic member and the spring in the holder.

5. The electronic device of claim 4, wherein the electromagnet defines a passing through hole therein, the locking pin is movably inserted into the passing through hole.

6. The electronic device of claim 3, wherein the sidewall defines a receiving through hole therein, the receiving through hole is aligned with the locking hole when the cover covers the main body, such that the locking pin can be inserted through the receiving through hole and inserted into the locking hole.

7. The electronic device of claim 2, wherein the switch is mounted on the main body.

8. An electronic device, comprising:
   a main body comprising a base and a seat protruding upwards from an edge of the base;
   a cover pivotally connected to the seat for covering the main body and comprising a cover plate and a sidewall protruding from the cover plate;
   at least one locking mechanism for fastening the cover to the main body, the at least one locking mechanism defining a locking hole in the sidewall and comprising a locking member received in the seat; and
   a switch electrically connected to the at least one locking mechanism for switching the at least one locking mechanism;
   wherein the locking member comprises:
   a magnetic member;
   an electromagnet electrically connected to the switch and operable to be powered on and powered off via switching the switch, the electromagnet being operable to attract the magnetic member when the electromagnet is powered on;
   a spring disposed between the magnetic member and the electromagnet, the spring being operable to push one of the magnetic member and the electromagnet toward the locking hole when the electromagnet is powered off; and
   a locking pin fixed to one of the magnetic member and the electromagnet, the locking pin being operable to move with one of the magnetic member and the electromagnet, in a first manner so as to detach from the locking hole when the electromagnet is powered on, and in a second manner so as to be inserted into the locking hole to fasten the cover to the main body when the cover covers the main body and the electromagnet is powered off,
   wherein the switch is operable to be switched off to power off the electromagnet when the cover rotates around the seat to move away from the main body, such that the spring is released from an attractive force generated by the electromagnet and the magnet, and the locking pin is urged by an elastic force of the spring to press the seat of the main body, so as to position the cover at a desired angle relative to the main body.

9. The electronic device of claim 8, wherein the electromagnet is fixed to the seat, the magnetic member is operable to move relative to the electromagnet, the locking pin is fixed to the magnetic member.

10. The electronic device of claim 9, wherein the magnetic member defines a fixing through hole therein, the locking pin is inserted through the fixing through hole, the spring is sleeved on the locking pin.

11. The electronic device of claim 10, wherein the main body comprises a holder, the magnetic member is movably received in the holder, the electromagnet is disposed on the holder to enclose the magnetic member and the spring in the holder.

12. The electronic device of claim 11, wherein the main body defines a receiving through hole therein, the receiving through hole is aligned with the locking hole when the cover covers the main body, such that the locking pin is inserted through the receiving through hole and inserted into the locking hole.

13. The electronic device of claim 9, wherein the switch is mounted on the main body.

* * * * *